(No Model.)
J. K. PUMPELLY.
METHOD OF PREPARING ELECTRODES FOR SECONDARY BATTERIES.
No. 417,088. Patented Dec. 10, 1889.
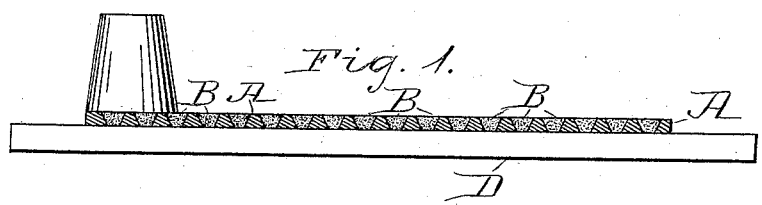
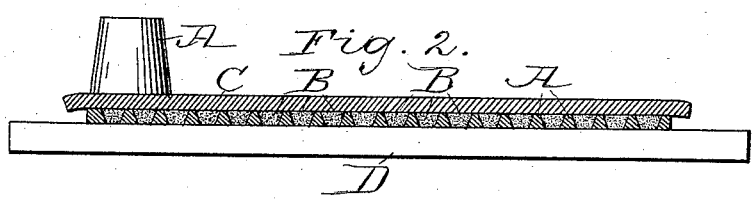

UNITED STATES PATENT OFFICE.

JAMES KENT PUMPELLY, OF CHICAGO, ILLINOIS, ASSIGNOR OF ONE-HALF TO FRANK D. THOMASON, OF SAME PLACE.

METHOD OF PREPARING ELECTRODES FOR SECONDARY BATTERIES.

SPECIFICATION forming part of Letters Patent No. 417,088, dated December 10, 1889.

Application filed October 3, 1889. Serial No. 325,869. (No specimens.)

*To all whom it may concern:*

Be it known that I, JAMES KENT PUMPELLY, of Chicago, in the county of Cook and State of Illinois, have invented certain new and useful Improvements in Methods of Preparing Electrodes for Secondary Batteries, of which the following is a full, clear, and exact description, reference being had to the accompanying drawings, and to the letters of reference marked thereon.

Heretofore in constructing storage-batteries the active material (peroxide of lead) has been applied to the plates of each electrode originally in the form of a paste or cement, or in the form of a powder. In the first instance, the plates are dried and then put in the cell and immersed in the electrolytic solution, with the result that considerable of the active material becomes dislodged, because of the fact that when the peroxide of lead is first made into a paste it swells. Then, when dried in the plates, it decreases in bulk to such extent that when subsequently immersed in the electrolytic solution and charged and discharged the ebullition of the solution washes out the same. In the latter case—*i. e.*, where the active material is applied in the form of a powder to the plates and subsequently immersed in the solution—such difficulty is experienced in handling each plate preparatory to and while building the electrodes, so as to keep the powder in the same, that the method is practically worthless. The method which involves the application of the active material to the plates in the form of a paste is the one most extensively adopted, and to prevent dislodgment various kinds of retaining appliances are used, which, in proportion as they do or do not create internal resistance, are more or less successful.

It is the object of my invention to avoid the objections enumerated above, and this I am enabled to do by a process at once simple and comparatively inexpensive, substantially as hereinafter fully described, and as illustrated in the drawings, in which—

Figure 1 shows the manner in which I fill the perforations of a plate with powdered peroxide of lead, and Fig. 2 shows the manner of dampening the same.

Referring to the drawings, A represents a perforated plate or grid of any desired shape. B represents the active material in the perforations thereof, and C represents pads of any suitable porous material.

The open plates A are first placed upon a perfectly plane metal or glass bed D, preferably of slightly larger surface dimensions than plate A, and then the perforations are filled and packed tightly with active material B. This done, the pad C, which has previously been saturated with the electrolytic solution, is placed over the plate A, as shown in Fig. 2, and then the position of the pad C, plate A, and bed D is reversed from that shown in said Fig. 2. The bed D is then removed from the upper surface of plate A, and a pad C, similar to that originally placed over the plate, is substituted for the bed. The said plate A is thus placed between two moist pads, which sufficiently dampen the active material to make a cement of it while within the perforations and before it is handled independently to form part of an electrode.

By packing the perforations with powdered peroxide of lead and while dry I am enabled to get within said perforations just as much active material as they can hold. By moistening the active material through the agency of pads C while within the perforations of the plate very little swelling of the same takes place in the direction of the plane of the plate, because of the obstructing walls of each perforation; but such expansion or swelling is accommodated laterally. Thus when the plates are dried there is little if any shrinkage of the active material in the direction of the plane of the plate, and the dislodgment of the active material from such perforations is much less likely to occur.

If desired, in order to make the active material more secure in said perforations, weights sufficient to prevent expansion may be placed upon the plates while the active material is being moistened between the pads.

I do not wish to be confined to the use of pads C for moistening the active material within plates A, as, obviously, the said material could be moistened in other ways. For example, an atomizer could be used to spray the solution over the powdered active material until sufficiently dampened to answer the purposes of my method. This would obviate the necessity of pads C, and also the necessity for reversing the plate, with or without the bed.

Instead of pads C being moistened before they are placed in the solution with the plates A, filled with active material B, I deem it within the scope of my invention to leave the pads dry and to place them in the solution with the prepared plates (that is, with dry active material in their perforations) between them while in such condition. By doing this and then passing the electric current through the said plates said plates are "formed," or, in other words, reduced to that condition in which they are rendered fit for practical use, much quicker and better, as experience has demonstrated, than can be accomplished in any other way.

What I claim as new is—

1. The method of applying active material to the plates or grids comprising the electrodes of electrical secondary batteries, consisting, first, of applying said active material to said plates in a powdered form, and then moistening said active material before said plates are immersed in the electrolytic solution, as set forth.

2. The method of applying active material to the plates or grids of a secondary battery, consisting of applying to and packing in said plates the active material in a powdered state, and then placing against each plate so treated a pad before said plates are immersed in the electrolytic solution, as set forth.

3. The method of applying active material to the plates or grids of a secondary battery, consisting in applying to said plates the active material in a powdered state, and then placing the same between pads moistened with the electrolytic solution before said plates are used in the construction of a battery.

4. The method of applying active material to the plates or grids of a secondary battery, consisting of applying to said plates the active material in a dry powdered form, then moistening the same, and finally drying the same before the said plates are used in the construction of a battery.

5. The method of applying active material to the plates or grids of a secondary battery, consisting of applying to said plates the active material in a dry powdered form, then moistening the same, then applying weights to the sides of said plates, as described, and finally drying the same before using in the construction of a battery.

JAMES KENT PUMPELLY.

Witnesses:
F. H. GOUI,
F. D. THOMASON.